Patented Mar. 11, 1924.

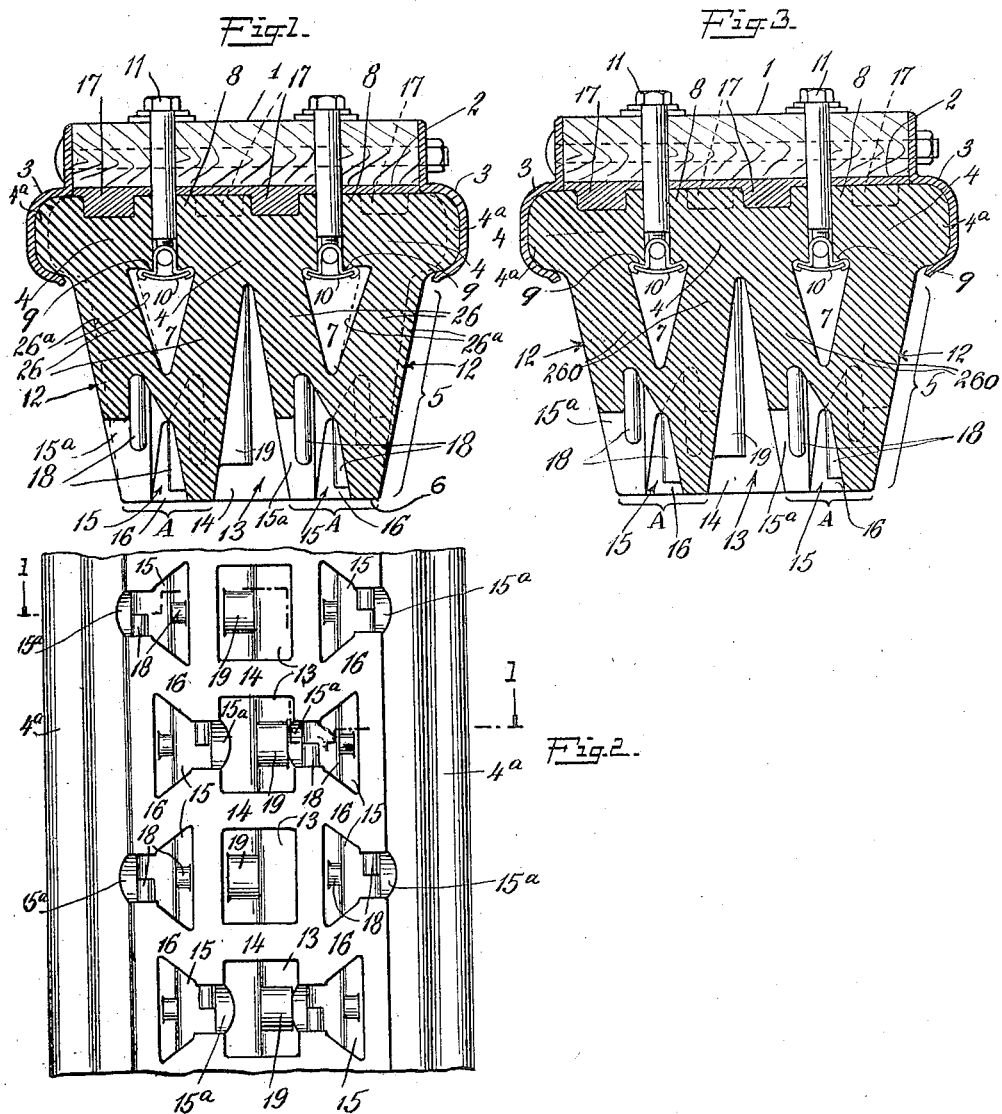

1,486,602

UNITED STATES PATENT OFFICE.

MAX CYRUS OVERMAN, OF NEW YORK, N. Y.

CUSHION TIRE.

Application filed March 11, 1919. Serial No. 282,027.

*To all whom it may concern:*

Be it known that I, MAX CYRUS OVERMAN, a citizen of the United States, residing at the city, county, and State of New York, have invented certain new and useful Improvements in Cushion Tires, of which the following is a specification.

My present invention relates to improvements in cushion tires, being more specifically improvements on my own existing tire of the same general type, as shown and described in my prior application Serial No. 263,368, filed November 20th, 1918, with the object of still more effectively counteracting any tendency of the tread portion to creep laterally while the tire is in action. This and still other objects and advantages are accomplished by my present improvements including the advantageous strengthening of the load-supporting value of the outer walls to the corresponding relief of the inner walls and of the other load-supporting parts in the central portion of the tire.

In the drawings, showing two of the possible embodiments my improvements are adapted to take, Fig. 1 is a cross-section of a tire within my present invention, being a section on the line 1—1 in Fig. 2 looking in the direction of the arrows, said Fig. 1 further showing in cross-section a form of flanged wheel-felly to which my tire is secured; Fig. 2 is an underneath plan view of the tire of Fig. 1; and Fig. 3 is a cross-section of another form of my improved tire, whose tread portion, however, may be the same as that shown in Fig. 2.

The tire is, of course, intended to be made of rubber or rubber compounds or their equivalent; and I will now describe the specific tire and devices of the drawings, the words "upper" and "lower" and similar expressions of location in its description and claims being intended to refer to a section of the tire positioned as in Fig. 1. Also the expression "straight" in the description and claims definitive of the shape of the inner and outer members; and similar expressions, of course refer to said members when looked at or considered in transverse section as in Figs. 1 and 3.

1 is the wheel-felly surrounded by the rim 2. 3—3 are the flanges bolted to the sides of the felly.

The tire comprises a wheel-engaging upper-portion 4 confined between the wheel-rim 2 and the flanges 3—3, which latter engage laterally rounded beads 4ᵃ on the sides of this portion of the tire. Integral with said upper portion of the tire is the lower portion 5 whose bottom 6 is the flat road-engaging tread of the tire. The tire, in its preferred form, and as shown, is hollow by means of a plurality of spaced apart openings or hollows 7—7 which are severally substantially V-shaped in cross-section (Fig. 1) with the tops of the V's at the upper portion of the tire and with the bottoms of the V's in the lower portion of the tire directed towards the tread. These hollows 7 extended longitudinally, preferably continuously so, without interruption, around and through the tire in spaced, parallel relationship with each other. The upper or base portion of the tire is divided into multiple base members by slots shown in cross-section at 8—8 in Fig. 1 extending upwardly therethrough from the top of the respective V-shaped hollows. Each of these slots extends circumferentially around the inside of the tire. Clamping beads 9 are thereby provided for engagement by a plurality of clamping plates 10 at the top of each hollow of the tire, said plates being adjustably connected with the felly by the bolt means 11 operably projecting through suitably spaced holes in the felly to draw the plates towards the felly to clamp the tire securely to the wheel.

The lower portion 5 of the tire is divided into lateral parts 12—12 by a cleft 13 extending up through it from the tread between the V-shaped hollows substantially to the upper portion 4 of the tire. This cleft extends circumferentially around the tire (Fig. 2) interrupted at intervals by cross-webs or bridges 14 which unite the aforesaid lateral parts 12—12 of the tire. From Fig. 1 it will be seen that the walls of this cleft diverge outwardly towards the tread of the tire. Also, said cross-webs 14 preferably are sufficiently thick to constitute an important factor in supporting the load and to this end should extend from the apex or top of the recess 13 downwardly until they are flush or substantially flush with the tread of the tire.

The webs 14 not only add to the load-supporting value of the walls to which they are joined rendering them more highly load-supporting than the outer walls, but also add to the general stabilization of the tire, since they tie the lateral parts together into a form better adapted to enable the walls to receive, resist, transmit and absorb the various vertical and lateral forces to which they are subjected as the tire travels on the road. These forces arise from supporting the load, mounting obstructions, turning corners, swerving, skidding, etc.

The proper and continuous functioning of a tire under all of these conditions necessitates that the various elements or members co-act to the fullest extent while each at the same time performs its allotted portion of the work.

Each of the lateral parts 12 under its V-shaped hollow has a deep longitudinal V-shaped hollow 15 in its tread portion interrupted at intervals by cross-webs 16 flush with the tread of the tire uniting the sides of the groove. The tread recesses 15 thus provided give a suitable flexibility and compressibility to the nose or tread portion of each lateral part 12—12; and also cause the tread thrusts to be delivered up under the walls 26 adjacent the hollows so that said walls under load are compressed vertically and thickened laterally but are not bent and broken down. 15$^a$ are extension recesses from the recesses 15 extending transversely in opposite directions through each half of the respective nose portions to the sides thereof, and also extending upwardly under the walls 26 as best shown in Fig. 1. From Fig. 2 it will be seen that the aforesaid cross-webs 16—16 in the nose portions of the two parts 12—12 of the tire are united endwise with the previously described cross-webs 14 of the cleft.

Preferably the adjacent cross-webs 16—16 in said parts 12—12 of the tire are transversely inclined in opposite directions as shown in Fig. 2 so that said cross-webs 14 of the cleft connect oppositely inclined webs 16—16.

The sides of the tire (see Fig. 1) steeply converge towards the tread similarly to the sides of the cleft.

It will be noted in Fig. 1 that the tread width A of an individual lateral part 12 of the tire is only about one-third of the height of the tire which is a proportion such that an individual part would be too flexible and unstable laterally to serve as a tire by itself. However, the plural lateral parts 12—12 become a practical tire of superior qualities when combined as shown and described.

Due to the cleft 13 and the plural hollows 7—7, the tire illustrated in Fig. 1 possesses two pairs of load-supporting or force resisting and transmitting side walls or members 26, each pair thereof containing one of the hollows between them.

The foregoing description applies up to this point to my earlier tire. One of my present improvements over said earlier tire consists in giving the outer walls 26 of said pairs a greater inclination to the vertical than the inner walls, said greater inclination resisting lateral forces and substantially preventing the tread from creeping laterally, while the tire is running on the ground. The tire of my present invention is a marked improvement in this respect over my earlier tire whose outer walls, bounded by the dotted lines 26$^a$—26$^a$ in Fig. 1, had the same inclination to the vertical as the inner walls.

My said improved tire of Fig. 1 shows that the respective V-shaped hollows 7 are unsymmetrical due to the greater inclination to the vertical of their outer sides, with resulting greater width on that side of the top of said hollows.

My other improved tire shown in Fig. 3 differs from Fig. 1 in substantially restoring the symmetrical form of the hollows 7, thereby thickening the outer walls 260 of the tire to a still greater extent than in Fig. 1 but still maintaining their greater inclination to the vertical as compared with the inner walls of the tire. The increased thickening not only tends to prevent lateral creeping of the tread, but in addition advantageously increases the load-supporting value of the outer walls, thereby saving the inner walls and other mid-portions of the tire from being over-worked.

The tire of Fig. 1, as compared with that of Fig. 3, is preferred for lighter loads due to the greater resiliency and easier riding-quality introduced by the enlarged hollows 7 and the lighter outer legs. Vice-versa, the tire of Fig. 3 is preferred for greater loads.

17—17 are the usual rectangular blocks as used by me, suitably staggered and spaced on the rim 2 fitting into correspondingly positioned and shaped recesses in the top or rim-surface of the tire to prevent creeping and to assist anchoring the tire on the wheel. 18 and 19 are integral projections formed respectively in the nose-recesses 15 and 15$^a$ and in the cleft 13 acting as pebble-ejectors.

I am aware that changes and modifications may be made in the foregoing which will nevertheless be within the spirit of the foregoing disclosure and within the spirit of the annexed claims, and which as such are accordingly intended to be covered thereby.

What I claim is:

1. A cushion tire whose cross-section with the tread downwards comprises a wheel-engaging upper portion; and a lower portion whose bottom is the road-engaging tread of the tire,—said tire being hollow by means of a plurality of spaced apart longitudinally extending hollows which are severally substantially V-shaped in cross-section with the top of the V's at said upper portion of the tire and with the bottoms of the V's in said lower portion of the tire directed towards the tread, said lower portion of the tire being divided into lateral parts by a cleft extending up through it from the tread between said V-shaped hollows, said tire, due to said cleft and hollows, having pairs of side-walls, each pair thereof converging steeply towards the tread with one of the hollows contained between them, the outer walls of said pairs being more inclined to the vertical than the inner walls.

2. A cushion tire whose cross-section with the tread downwards comprises a wheel-engaging upper portion, and a lower portion whose bottom constitutes the road-engaging tread of the tire, said lower portion of the tire being divided into lateral parts by a cleft which extends up through it from the tread and toward the wheel-engaging upper portion, each lateral part of the tire having a pair of laterally spaced inclined walls which are joined at the tread of the respective lateral part, the outer walls of said pairs being more inclined to the vertical than the inner walls which are spaced laterally by said cleft, thereby opposing lateral creeping of the tread portion of the tire.

3. A cushion tire whose cross-section with the tread downwards comprises a wheel-engaging upper portion; and a lower portion whose bottom is the tread of the tire having a substantially flat contact with the road,—said tire being hollow by means of a plurality of spaced apart longitudinally extending hollows whose tops are at said upper portion of the tire and whose bottoms extend down into its lower portion, which lower portion is divided into lateral parts by a cleft extending up through it from the tread between said hollows, said tire, due to said cleft and hollows, possessing pairs of side-walls, each pair thereof containing one of the hollows between them, the outer walls of said pairs converging downwardly towards the tread at a greater angle to the vertical than the more upright inner walls, thereby opposing lateral creeping of the tread portion of the tire.

4. A cushion tire whose cross-section with the tread downward comprises a wheel-engaging upper portion; and a lower portion whose bottom is the tread of the tire having a substantially flat contact with the road,—said tire being hollow by means of a plurality of spaced apart longitudinally extending hollows whose tops are at said upper portion of the tire and whose bottoms extend down into its lower portion, which lower portion is divided into lateral parts by a cleft extending up through it from the tread between said hollows, said cleft extending circumferentially around the tire interrupted at intervals by load-bearing cross-webs uniting said lateral parts flush with the tread of the tire, each of which has recesses in its tread portion separated by transversely extending webs, these webs and the aforesaid webs across the cleft being united endwise with one another, said tire, due to said cleft and hollows, possessing pairs of side-walls, each pair thereof containing one of the hollows between them, the outer walls of said pairs converging downwardly towards the tread at a greater angle to the vertical than the more upright inner walls, thereby opposing lateral creeping of the tread portion of the tire.

5. A cushion tire whose cross-section with the tread downwards comprises a wheel-engaging upper portion, and a lower portion whose bottom is the road-engaging tread of the tire, said lower portion of the tire being divided into lateral parts by a cleft which extends up through it from the tread and toward its wheel-engaging upper portion, said cleft extending circumferentially around the tire interrupted by cross-webs which unite said lateral parts, each lateral part of the tire having inner and outer inclined side walls which are spaced apart laterally and joined at the tread of the respective lateral part, the outer walls of the lateral parts being more inclined to the vertical than the inner walls thereof.

6. A cushion tire whose cross-section with the tread downward comprises a wheel-engaging upper portion; and a lower portion whose bottom is the tread of the tire having a substantially flat contact with the road,—said tire being hollow by means of a plurality of spaced apart longitudinally extending hollows whose tops are at said upper portion of the tire and whose bottoms extend down into its lower portion, which lower portion is divided into lateral parts by a cleft extending up through it from the tread between said hollows, said cleft extending circumferentially around the tire interrupted at intervals by load-bearing cross-webs uniting said lateral parts flush with the tread of the tire, each of which has recesses in its tread portion separated by transversely extending webs, these webs and the aforesaid webs across the cleft being united endwise with one another, said tire, due to said cleft and hollows, possessing pairs of side-walls, each pair thereof containing one of the hollows between them, the outer walls of said pairs converging downwardly towards the tread at a greater angle to the vertical than the more upright inner walls, thereby opposing lateral creeping of the tread portion of the tire, and said outer walls having greater thickness than said inner walls.

7. A cushion tire whose cross-section with the tread downwards comprises a wheel-engaging upper portion, and a lower portion whose bottom is the road-engaging tread of the tire, said lower portion of the tire being divided into lateral parts by a cleft which extends up through it from the tread, said cleft extending circumferentially around the tire interrupted by cross-webs which unite said lateral parts, each lateral part of the tire embodying a pair of laterally spaced side walls which converge toward and are joined at the tread of such lateral part, the pair of side walls of one lateral part being spaced laterally from the pair of side walls of the other lateral part by said cleft, the outer walls of the respective pairs being more inclined to the vertical than the inner walls, and said outer walls having greater thickness than said inner walls.

8. A cushion tire whose cross-section with the tread downwards comprises a wheel-engaging upper portion; and a lower portion whose bottom is the road-engaging tread of the tire,—said tire being hollow by means of a plurality of spaced apart longitudinally extending hollows which are severally substantially V-shaped in cross-section with the top of the V's at said upper portion of the tire and with the bottoms of the V's in said lower portion of the tire directed towards the tread, said lower portion of the tire being divided into lateral parts by a cleft extending up through it from the tread between said V-shaped hollows, said cleft extending circumferentially around the tire interrupted by cross-webs uniting said lateral parts, the outer walls of said tire adjacent said hollows being thicker than the inner walls.

9. A cushion tire comprising a wheel-engaging base portion and a flange-free lower portion formed integrally therewith, said lower portion comprising inner and outer substantially straight space-separated inclined force-resisting and transmitting members, all united at the tread, the outer being more inclined to the vertical than the inner, said lower portion having a wide ground contact to deliver the thrusts from the tread well under all of said inner and outer members, all of which thicken laterally under load and expand into said spaces without bending collapse.

10. A cushion tire comprising a wheel-engaging base portion and a flange-free lower portion formed integrally therewith, said lower portion comprising inner and outer substantially straight space-separated inclined force-resisting and transmitting members, all united at the tread toward which the outer members steeply converge, the inner being more highly load-supporting than the outer members, and the outer being more inclined to the vertical than the inner, said lower portion having a wide ground contact to deliver the thrusts from the tread well under all of said inner and outer members, all of which thicken laterally under load and expand into said spaces without bending collapse.

11. A cushion tire comprising a wheel-engaging base portion and a flange-free lower portion integrally formed therewith, the bottom of which is the tread of the tire, said lower portion comprising a plurality of inclined substantially straight force-resisting and transmitting inner and outer members, the outer members being more inclined to the vertical than the inner, said inner members being laterally separated from each other and from the outer members by spaces into which they expand laterally by thickening when under load, the space between the inner members having a greater height than the spaces between the inner and outer members.

12. A cushion tire comprising the combination with a tread portion, of a base portion integrally joined to said tread portion by a plurality of force-resisting and transmitting inner and outer members, said inner members being substantially straight and laterally separated from each other and from the outer members by spaces into which they may expand when compressed, the outermost of said members being more inclined to the vertical and adapted to resist lateral forces to a greater degree than the innermost of said members.

13. A cushion tire comprising the combination with a tread portion, of a base portion embodying multiple base members, severally integrally joined to said tread portion by a plurality of force-resisting and transmitting inner and outer members, said inner members being substantially straight and laterally separated from each other and from the outer members by spaces into which they may expand when compressed, the outer members being more inclined to the vertical than the inner members.

In testimony whereof, I have signed my name to this specification this 10th day of March, 1919.

MAX CYRUS OVERMAN.